United States Patent Office 3,542,730
Patented Nov. 24, 1970

3,542,730
FLUORINE-CONTAINING POLY-M-CARBORANYLENESILOXANES
Stelvio Papetti and Hansjurgen A. Schroeder, Hamden, and Santad Kongpricha, North Haven, Conn., assignors to Olin Corporation, a corporation of Virginia
No Drawing. Filed Aug. 16, 1968, Ser. No. 753,060
Int. Cl. C08f 11/04
U.S. Cl. 260—46.5                                                                           5 Claims

ABSTRACT OF THE DISCLOSURE

Fluorine - containing poly - m - carboranylenesiloxanes comprising recurring units having the formula

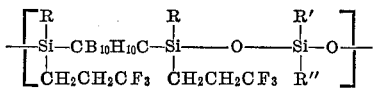

wherein R is alkyl, fluoroalkyl or aryl and R' and R'' are independently selected alkyl, fluoroalkyl, cyanoalkyl or aryl are prepared by the condensation of a 1,7-bis[halo-(or alkoxy)-alkyl(or aryl)-3,3,3-trifluoropropylsilyl]-m-carborane with an appropriate dihalosilane or dialkoxysilane in the presence of ferric chloride. These poly-m-carboranylenesiloxanes are suitable for the preparation of solvent resistant, thermally stable coatings.

---

This invention relates to fluorine-containing poly-m-carboranylenesiloxanes suitable for use in the preparation of thermally stable, solvent resistant coatings. More particularly, this invention relates to poly-m-carboranylenesiloxanes comprising recurring units having the formula

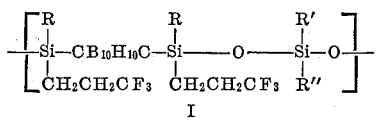

wherein R is alkyl, fluoroalfiyl or aryl and R' and R'' are independently selected alkyl, fluoroalkyl, cyanoalkyl or aryl.

Various polycarboranylenesiloxanes have been previously prepared and reported in the literature. Thus, S. Papetti et al. in J. Polymer Science, Part A–1, 4, 1623–1636 (1966) disclose the preparation of several non-halogenated polycarboranylenesiloxanes, varying in form from crystalline materials and liquids through rubbers. While coatings useful in selected applications can be successfully prepared from some of these non-halogenated liquid polycarboranylenesiloxanes, investigators have attempted to prepare halogen-containing polymers capable of providing thermally stable, solvent-resistant coatings.

Thus, for example, a polycarboranylenesiloxane containing one chloromethyl group in the repeating unit has been disclosed by H. Schroeder et al. in Rubber Chemistry and Technology, volume 39, No. 4, Part 2, September, 1966. While this polycarboranylenesiloxane does exhibit some improvement in solvent resistance over the non-halogenated polycarboranylenesiloxane, it is an insoluble rubber incapable of being dissolved in solvents to provide useful coatings.

Now it has been found in accordance with the practice of this invention that liquid, thermally stable, soluble polycarboranylenesiloxanes capable of providing solvent resistant coatings can be successfully prepared.

More specifically, the fluorine-containing poly-m-carboranylenesiloxanes I are provided by the ferric chloride catalyzed condensation of a 1,7-bis[halo(or alkoxy)-alkyl(or aryl) - 3,3,3 - trifluoropropylsilyl]-m-carborane with a dihalosilane or dialkoxysilane in accordance with the following equation wherein R is as previously described and X and Y are halogen or lower alkoxy, with the proviso that where X is halogen, Y is lower alkoxy, and vice versa.

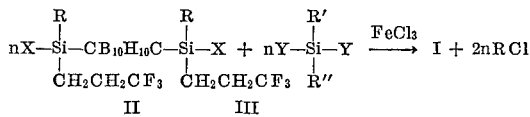

1,7-bis[haloalkyl(or aryl) - 3,3,3-trifluoropropylsilyl]-m-carboranes having the Formula II are readily provided according to the process described by S. Papetti et al. in Inorg. Chem., 3, 1448 (1964) for the preparation of 1,7-bis(chlorodimethylsilyl)-m-carborane. Thus, m-carborane is first reacted with an alkali metal alkyl or alkali metal aryl to provide dialkali metal m-carborane. The dialkali metal m-carborane is then reacted with an appropriate (3,3,3-trifluoropropyl)alkyl(or aryl)dichlorosilane to provide the desired 1,7 - bis[haloalkyl(or aryl) - 3,3,3 - trifluoropropylsilyl]-m-carborane. A temperature between about $-90°$ C. and $+50°$ C. is generally employed and preferably an inert diluent such as diethylether, benzene, aliphatic hydrocarbons, etc. is utilized in the preparation of 1,7-bis[haloalkyl(or aryl)-3,3,3 - trifluoropropylsilyl]-m-carborane from m-carborane.

Exemplificative 1,7-bis[haloalkyl(or aryl) - 3,3,3 - trifluoropropylsilyl]-m-carboranes include 1,7 - bis[chloro-(3,3,3 - trifluoropropyl)-tolylsilyl]-m-carborane; 1,7-bis[chloro - (3,3,3-trifluoropropyl)-ethylsilyl]-m-carborane; 1,7 - bis[chloro(3,3,3-trifluoropropyl)-n-propylsilyl]-m-carborane; 1,7-bis[chloro-(3,3,3-trifluoropropyl)-isoamyl silyl]-m-carborane; 1,7 - bis[chloro-(3,3,3 - trifluoropropyl)-n-octylsilyl]m - carborane; 1,7-bis[chloro-(3,3,3-trifluoropropyl) - phenylsilyl]-m-carborane; 1,7-bis[chloro-(3,3,3 - trifluoropropyl)-tolylsilyl]-m-carbonate; 1,7-bis-[chloro - (3,3,3 - trifluoropropyl)-xylylsilyl] - carborane and the corresponding bromine and iodine derivatives.

1,7 - bis[alkoxylalkyl(or aryl)-3,3,3-trifluoropropyl]-m-carboranes having the Formula II are provided by reacting the previously described 1,7-bis[haloalkyl(or aryl)-3,3,3-trifluoropropylsilyl]-m-carboranes II with an appropriate alcohol according to the process described by S. Papetti et al. in Inorg. Chem. 3, 1448 (1964). Suitable alcohols include methanol, ethanol, n-propanol, n-butanol, etc. Generally the reaction is carried out at a temperature between about $-10°$ C. to $+175°$ C. and optionally an inert solvent may be employed.

The silanes having the Formula III suitable for use in the preparation of poly-m-carboranylenesiloxanes I include dimethylidchlorosilane, diethyldichlorosilane, ethylmethyldichlorosilane, diamyldichlorosilane, diphenyldichlorosilane, ditolyldichlorosilane, (3,3,3 - trifluoropropyl) - methyldichlorosilane, (3,3,3 - trifluoropropyl)-n-propyldichlorosilane, (3,3,3 - trifluoropropyl)-phenyldichlorosilane, di - (3,3,3 - trifluoropropyl) - dichlorosilane, cyanoethyl - methyldichlorosilane, cyanomethylmethyldichlorosilane, cyanopropyl - dichlorosilane, dicyanoethyldichlorosilane, and the corresponding di(lower alkoxy)silanes.

While any fluorine-containing poly-m-carboranylenesiloxane having the Formula I can be provided according to this invention, preferred embodiments include those poly-m-carboranylenesiloxanes I wherein R is lower alkyl and R' and R'' are independently selected lower alkyl, trifluoro(lower)alkyl and particularly trifluoropropyl, cyano(lower)alkyl or phenyl, wherein lower alkyl in the previously mentioned moieties is alkyl having 1–4 carbon atoms.

The polymers of this invention are characterized by having at least two trifluoropropyl groups in each recurring unit; these poly-m-carboranylenesiloxanes are viscous liquids having molecular weights between about 1500 and about 10,000.

While the poly-m-carboranylenesiloxanes I of this invention are readily cured to provide solvent-resistant coatings as described hereinafter, the curing process can be aided by incorporating siloxane units bearing vinyl or vinyl-containing substituents on the silicon atom in the polymer backbone. This is accomplished by employing as a coreactant in the previously described process a compound such as dichloromethylvinylsilane, dichloro(1 - vinylcarboran - 2 - yl)methylsilane, etc. Where such a coreactant is employed, the resulting poly-m-carboranylenesiloxane consists of recurring units having the Formula I, with a small amount of a repeating unit identical to that of Formula I wherein R' or R'' is the desired vinyl or vinyl-containing substituent.

The ferric chloride employed as the catalyst in the preparation of the polymers of this invention may be used in its anhydrous form or any of its various hydrated forms, e.g., $FeCl_3 \cdot 6H_2O$; mixtures of hydrated and anhydrous ferric chloride can also be suitably employed. The amount of catalyst can be varied from about 0.01 to about 10 mole percent based on the total number of moles of reactants employed, but preferably from about 0.05 to about 3.0 mole percent is employed.

The preparation of poly-m-carboranylenesiloxanes I is generally carried out at a temperature from about 75° to about 250° C. and preferably from about 90° to about 190° C. If the rate of reaction, as measured by the evolution of gaseous alkyl chloride by-product, decreases prior to completion of the reaction, additional catalyst can be added and/or the temperature increased. Elimination of the ferric chloride catalyst from the polymeric products is accomplished by washing an ethereal solution of the product with dilute hydrochloric acid.

The preparation of thermally stable, solvent resistant coatings is readily accomplished by dissolving the desired poly-m-carboranylenesiloxane I in an appropriate organic solvent such as xylene, toluene, methylethyl ketone, etc., and subsequently applying the solution to the desired substrate, evaporating solvent and curing by heating at elevated temperatures, e.g., 300–600° C. The resulting coatings are glassy, tough and flexible; they can be exposed to extremely high temperatures for extended periods of time, exhibit good adhesion to the substrate, and excellent resistance to organic solvents. Coatings can be provided on substrates such as metal, glass cloth, high temperature nylon fabric, polyimide films, etc., and are particularly suitable for use in aircrafts and other specialty applications where thermally stable, solvent resistant coatings are required.

For example, the poly-m-carboranylenesiloxanes I are used for dip coating wires which come in contact with corrosive liquids such as hot refrigerants; they are used as protective coatings of coils in electric applications where splashing with fuels occurs to diminish corrosion wear; furthermore, they are useful as valve and pipeline coatings in the oil industry in applications where coatings capable of sustained operation in the 500° to 700° F. area are required.

The following examples will serve to illustrate the preparation of various poly-m-carboranylenesiloxanes I in accordance with the practice of this invention.

EXAMPLE 1

(A) Preparation of monomers

Butylithium (470 ml. of 2.13 N solution, 1 mole) in hexane was added dropwise, with stirring, to a solution of m-carborane (64.935 g., 0.45 mole) in 150 ml. of dry ether at −10 to −5° C. Dilithio-m-carborane precipitated and was filtered, washed twice with 200 ml. portions of hexane, and added to 120 ml. of dry ether. The dilithio-m-carborane slurry was added slowly, with vigorous stirring, to (3,3,3 - trifluoropropyl)methyldichlorosilane (211.1 g., 1 mole) in 100 ml. of ether at 0° C. After completion of the addition, the reaction mixture was stirred at ambient temperature for two hours and filtered. Then the filtrate was evaporated to dryness and the liquid residue fractionally distilled to provide 109 g. of liquid product having a boiling point of 133–134° C./0.07 mm. Hg. The following analytical data revealed that 1,7 - bis[chloro - (3,3,3 - trifluoropropyl) - methylsilyl]-m-carborane had been obtained.

*Analysis.*—Calcd. for $C_{10}H_{24}B_{10}Si_2Cl_2F_6$ (percent): C, 24.33; H, 4.90; B, 21.92; Cl, 14.37; F, 23.10. Found (percent): C, 24.46; H, 4.60; B, 21.98; Cl, 14.35; F, 22.86.

The amount of 97 g. of the 1,7-bis[chloro-(3,3,3-trifluoropropyl)methylsilyl]-m-carborane was added dropwise, with stirring, to absolute methanol (79 g., 2.45 moles) at 0° C. The resutling solution was heated at 55–60° C. for one hour and the excess methanol and residual hydrogen chloride were removed in vacuo. The liquid residue was treated twice in the same manner with 100 ml. aliquots of methanol and distilled to provide 83.5 g. of liquid product, B.P. 135–137° C./0.08 mm. Hg, $n_D^{25}$ 1.4656. The following analytical data revealed that 1,7-bis[methoxy-(3,3,3 - trifluoropropyl)-methylsilyl]-m-carborane had been obtained.

*Analysis.*—Calcd. for $C_{12}H_{30}B_{10}Si_2O_2F_6$ (percent): C, 29.73; H, 6.24; B, 22.32; F, 23.52. Found (percent): C, 29.68; H, 6.17; B, 22.30; F, 22.92.

(B) Preparation of polymer

A portion (4.662 g., 0.0096 mole) of the 1,7-bis[methoxy-(3,3,3 - trifluoropropyl)methylsilyl]-m-carborane was mixed with dimethyldichlorosilane (1.241 g., 0.0096 mole) and one mole percent of a 1:1 mixture of $FeCl_3 \cdot 6H_2O$ and anhydrous ferric chloride (based on the total number of moles of starting materials) in a one-liter resin kettle equipped with a stainless steel stirrer, reflux condenser and a nitrogen inlet line for flushing the apparatus. The reaction flask was also connected to a vacuum line having a bubble-off and an outlet for sampling volatile products. A wet test meter was connected to the bubble-off to measure methyl chloride evolution. The flask was placed in an oil bath and heated gradually to 140° C. After 1¼ hours at 140° C., gas evolution ceased; another one mole percent of the ferric chloride catalyst mixture was added and the temperature raised to 188° C. over a 23 minute period. After heating at 184–188° C. for an additional hour, the product was dissolved in ether, washed with dilute hydrochloric acid and the ether layer evaporated to dryness. The molecular weight of the product, as determined by the Osmometric method in tetrahydrofuran, was found to be 5060. The following analytical data revealed that a poly-m-carboranylenesiloxane comprising recurring units having the following formula had been obtained.

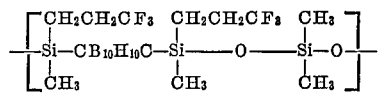

*Analysis.*—Calcd. for $C_{12}H_{30}B_{10}Si_3O_2F_6$ (percent): C, 28.10; H, 5.90; B, 21.10; F, 22.23. Found (percent): C, 28.31; H, 6.07; B, 21.23; F, 22.32.

EXAMPLE 2

Following the procedure of Example 1, a mixture of 1,7 - bis[methoxy-(3,3,3-trifluoropropyl)methylsilyl]-m-carborane (110.9 g., 0.229 mole), dimethyldichlorosilane (29.4 g., 0.228 mole), dichloro(1-vinyl-o-carborane-2-yl)-methylsilane (0.195 g., 0.00069 mole) and one mole percent of a 1:1 mixture of $FeCl_3 \cdot 6H_2O$ and anhydrous ferric chloride was heated at a temperature between about 104–138° C. After about one hour, cessation of evolution of methyl chloride by-product indicated that the reaction has ceased. A second one mole portion of ferric chloride catalyst was added and the reaction mixture heated at a temperature of 180–185° C. to insure completion of the reaction. Then the reaction mixture was dissolved in ether, and the ether solution washed with dilute hydrochloric acid, then with water, dried over magnesium sulfate, and distilled under vacuum, providing a residue of 97.1 g. of liquid polymer. The molecular weight of the product, as determined by the Osmometric method in tetrahydrofuran, was found to be 4477. The following analytical data revealed that a poly-m-carboranylenesiloxane comprising recurring units having the following formula was obtained.

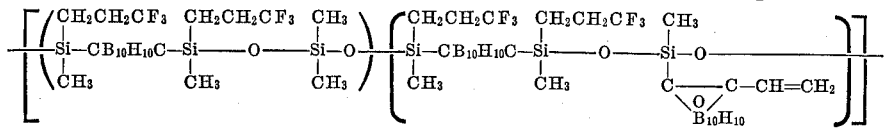

*Analysis.*—Calcd. for

C, 28.10; H, 5.90; B, 21.14; F, 22.21; O, 6.23; Si, 16.42. Found (percent): C, 28.45; H, 5.92; B, 21.60; F, 24.28; Si, 16.53.

EXAMPLE 3

Following the procedure of the previous examples, 1,7-bis[methoxy - (3,3,3 - trifluoropropyl)methylsilyl]-m-carborane (15.533 g., 0.032 mole) and (3,3,3-trifluoropropyl)-methylidichlorosilane (6.7636 g., 0.03204 mole) was heated in the presence of one mole percent of a 1:1 mixture of FeCl$_3$·6H$_2$O and anhydrous ferric chloride at a temperature between about 110 and 135° C. After cessation of evolution of methyl chloride, a second one mole percent portion of ferric chloride catalyst was added and the reaction mixture heated at 180–185° C. to insure completion of the reaction. Then the reaction mixture was treated as described in the previous examples to provide a liquid polymeric material having a molecular weight of 1705 (Osmometric method in tetrahydrofuran). The following analytical data revealed that a poly-m-carboranylenesiloxane comprising recurring units having the following formula had been obtained.

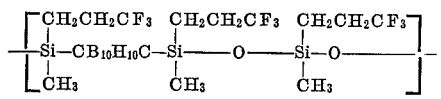

*Analysis.*—Calcd. for C$_{14}$H$_{31}$B$_{10}$Si$_3$O$_2$F$_9$ (percent): C, 28.26; H, 5.25; B, 18.19; F, 28.75. Found (percent): C, 28.30; H, 6.68; B, 18.22; F, 25.66.

EXAMPLE 4

A mixture of 1,7-bis[methoxy-(3,3,3-trifluoropropyl)-methylsilyl]-m-carborane (101.2 g., 0.209 mole), (3,3,3-trifluoropropyl)methyldichlorosilane (43.9 g., 0.208 mole) and dichloro(1-vinyl-o-carboran-2-yl)methylsilane (0.178 g., 0.00063 mole), was heated in the presence of one mole percent of a 1:1 mixture of FeCl$_3$·6H$_2$O and anhydrous ferric chloride at 114–137° C. for 30 minutes. An additional one mole percent of the ferric chloride catalyst was added and the reaction mixture heated at 183–186° C.; after about one hour, the gas evolution stopped. The temperature was maintained for 30 additional minutes, and the reaction mixture cooled and treated as described in the previous examples to provide 100 g. of colorless liquid. The product had a molecular weight of 1769 (Osmometric method in tetrahydrofuran). The following analytical data revealed that a poly-m-carboranylenesiloxane comprising recurring units having the following formula had been obtained.

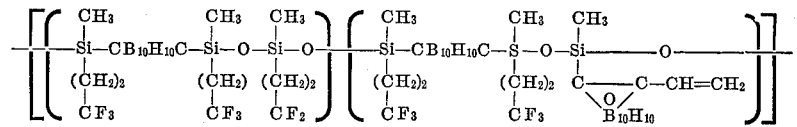

*Analysis.*—Calcd. for

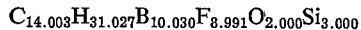

(percent): C, 28.26; H, 5.25; B, 18.24; F, 28.71; O, 5.38; Si, 14.16. Found (percent): C, 28.32; H, 6.15 B, 17.80; F, 26.82; Si, 13.76.

EXAMPLE 5

Following the procedure of Example 4, a mixture of 1,7-bis[methoxy - (3,3,3 - trifluoropropyl)methylsilyl]-m-carborane (13.94 g., 0.0288 mole) and diphenyldichlorosilane (7.28 g., 0.0288 mole) was reacted in the presence of one mole percent of a 1:1 mixture of FeCl$_3$·6H$_2$O and anhydrous ferric chloride. The product was a liquid having a molecular weight, as determined by the Osmometric method in tetrahydrofuran, of 2750. The following analytical data revealed that a poly-m-carboranylenesiloxane comprising recurring units having the following formula had been obtained.

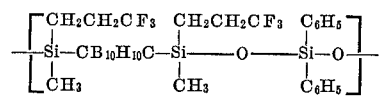

*Analysis.*—Calcd. for C$_{22}$H$_{34}$B$_{10}$Si$_3$O$_2$F$_6$ (percent): C, 41.43; H, 5.38; B, 16.99; Si, 13.23; F, 17.90. Found (percent): C, 42.35; H, 5.34; B, 14.39; Si, 14.22; F, 14.53.

EXAMPLE 6

A mixture of 1,7-bis[methoxy-(3,3,3-trifluoropropyl)-methylsilyl]-m-carborane (27 g., 0.055 mole) and cyanoethylmethyldiethoxysilane (10.35 g., 0.055 mole) was reacted in the presence of one mole percent of anhydrous ferric chloride according to the conditions set forth in the previous example. A liquid product having a molecular of 2110 (Osmometric method in tetrahydrofuran) was obtained. The following analytical data revealed that a poly-m-carboranylenesiloxane comprising recurring units having the following formula had been obtained.

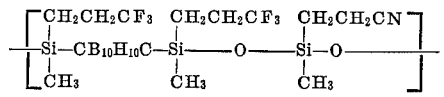

*Analysis.*—Calcd. for C$_{14}$H$_{31}$B$_{10}$F$_6$NO$_2$Si$_3$ (percent): C, 30.47; H, 5.66; B, 19.59; F, 20.66; N, 2.54; Si, 15.27. Found (percent): C, 30.69; H, 5.67; B, 19.26; F, 19.54; N, 2.45; Si, 14.56.

EXAMPLE 7

Coatings were prepared from the poly-m-carboranylenesiloxanes described in Examples 1, 3 and 5 and tested for solvent resistance in the following manner.

Fifty parts of xylene were added to 100 parts of the poly-m-carboranylenesiloxane and the mixture agitated to effect solution of the polymer. The resulting solution was applied to a 1 x 4 inch steel finger panel over a 6 sq. in. area and gradually cured to a dry thickness of about 10 mils by heating for appropriate intervals at increasing temperature levels; the curing conditions are as follows:

| Poly-m-carboranylenesiloxane | Hours held at indicated temp. | | |
|---|---|---|---|
| | 300° F. | 500° F. | 600° F. |
| Example 1 | ½ | 16 | 1 |
| Example 3 | ½ | 16 | 1 |
| Example 5 | ½ | 2 | |

Duplicate samples of each poly-m-carboranylenesiloxane were tested for solvent resistance by immersion of coated steel panels in ASTM Reference Fuel B (70% isooctane, 30% toluene) for 7 days at ambient temperature; at the end of the immersion period the panels were dipped into petroleum ether and air dried.

In a similar manner, samples were immersed in ASTM Reference Oil No. 2 for 5 days at 150° C., dipped in petroleum ether and air dried.

None of the coatings was physically affected by the aforementioned tests; no solution, blistering, wrinkling or loosening was observed.

What is claimed is:

1. A poly-m-carboranylenesiloxane comprising recurring units having the formula

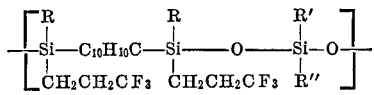

wherein R is lower alkyl and R' and R" are independently selected from the group consisting of lower alkyl, trifluoro(lower)alkyl, cyano(lower)alkyl and phenyl.

2. The poly-m-carboranylenesiloxane of claim 1 wherein R, R' and R" are methyl.

3. The poly-m-carboranylenesiloxane of claim 1 wherein R and R' are methyl and R" is trifluoropropyl.

4. The poly-m-carboranylenesiloxane of claim 1 wherein R is methyl and R' and R" are phenyl.

5. The poly-m-carboranylenesiloxane of claim 1 wherein R and R' are methyl and R" is cyanoethyl.

References Cited

UNITED STATES PATENTS 3,457,223   7/1969   Papetti _____ 260—46.5

DONALD E. CZAJA, Primary Examiner

M. I. MARQUIS, Assistant Examiner

U.S. Cl. X.R.

117—124, 135.1, 138.8; 260—448.2, 606.5